US011911337B2

(12) United States Patent
Stan

(10) Patent No.: US 11,911,337 B2
(45) Date of Patent: Feb. 27, 2024

(54) DEVICE FOR DISPENSING ACUPUNCTURE NEEDLE

(71) Applicant: Eastern Currents Ltd., Vancouver (CA)

(72) Inventor: John Dumitru Stan, Vancouver (CA)

(73) Assignee: Eastern Currents Ltd., Vancouver (CA)

( * ) Notice: Subject to any disclaimer, the term of this patent is extended or adjusted under 35 U.S.C. 154(b) by 114 days.

(21) Appl. No.: 17/536,315

(22) Filed: Nov. 29, 2021

(65) Prior Publication Data

US 2022/0168184 A1 Jun. 2, 2022

Related U.S. Application Data

(60) Provisional application No. 63/119,595, filed on Nov. 30, 2020.

(51) Int. Cl.
*A61H 39/08* (2006.01)

(52) U.S. Cl.
CPC ......... *A61H 39/083* (2013.01); *A61H 39/086* (2013.01)

(58) Field of Classification Search
CPC ..... A61H 39/08; A61H 39/083; A61H 39/086
See application file for complete search history.

(56) References Cited

U.S. PATENT DOCUMENTS 4,139,011 A * 2/1979 Benoit .................. A61H 39/08 606/189
5,624,460 A * 4/1997 Yoo ......................... A61M 5/32 606/189
5,741,291 A * 4/1998 Yoo ........................ A61H 39/08 606/189
9,278,047 B2 * 3/2016 Stan ..................... A61H 39/083
10,614,143 B2 4/2020 Yoo

* cited by examiner

*Primary Examiner* — Todd J Scherbel
(74) *Attorney, Agent, or Firm* — McMillan LLP

(57) ABSTRACT

This disclosure describes an device for dispensing an acupuncture needle. The device comprises a thrust, a coupling mechanism coupled to the thrust, a biasing mechanism adapted to bias the thrust towards an initial position, a housing, and a conduit. The housing comprises a first cavity portion adapted to receive the thrust, the coupling mechanism and the biasing mechanism, and a second cavity portion in fluid communication with the first cavity portion. The second cavity portion has a smaller cross-sectional area than the first cavity portion, and the thrust is received in the first cavity portion. The conduit is adapted to guide an acupuncture needle toward the coupling mechanism disposed within the housing. This disclosure further describes a method of using said device for inserting an acupuncture needle into the dermis of a subject.

17 Claims, 10 Drawing Sheets

DEVICE FOR DISPENSING ACUPUNCTURE NEEDLE

TECHNICAL FIELD

The present disclosure relates to a device for use in the acupuncture industry, and more particularly a device for dispensing an acupuncture needle.

BACKGROUND

Acupuncture needles are generally packaged individually (tubed or un-tubed versions) or together in bulk packaging. Bulk packaging varieties include, but are not limited to, "blister" style packaging (either with a paper back or foil back or other suitable backing) and plastic "pouch" packaging. Owing to at least environmental concerns, and perhaps packaging cost concerns, the acupuncture industry in recent years has been moving more towards bulk packaging; presently, it is not uncommon for 5, 10, or 20 acupuncture needles to be packaged together with one or more guide tubes included in the packaging. Plastic insertion tubes may also be packaged separately from needles, and such empty tubes may also be bulk packaged in groups of 5, 10, or 20 per package.

Bulk packaged needles generally require the acupuncture practitioner to remove a needle from packaging and load the needle into a guide tube before inserting said needle into the dermis of a subject. Other methods may require a practitioner to re-insert the same needle into adjacent dermis. Regardless, the process of loading a needle into a guide tube requires due care in order to "catch" the needle at the other end of the open tube, retract the needle such that the tip of the needle is retracted into the lumen of the tube, position the tube and needle securely at the point of insertion, and "tap" the exposed needle handle to insert the needle into the dermis of a patient. This process can be cumbersome, and the process of re-inserting needles is time consuming; as a result, bulk-style packaged needles are generally less desirable from a practice efficiency standpoint than needles that come pre-loaded into guide tubes.

Some hand acupuncture needle assemblies that minimize an acupuncturist's handling of a needle have been previously described (e.g. U.S. application Ser. No. 10/614,143 to Tae Woo Yoo). However, such devices lack an easy to use means of dispensing the needles from said devices.

SUMMARY

Described in this disclosure is a device into which an acupuncture needle can be loaded and from which the acupuncture needle can be dispensed without direct contact of the shaft of the acupuncture needle by a device operator (e.g. acupuncturist). In at least some instances, the acupuncture needles can be dispensed in a rapid manner from the device without direct contact of the shaft of the acupuncture needle by the device operator.

Described in this disclosure is a device that may minimize the likelihood of an acupuncture practitioner contaminating a shaft of a needle during a process of inserting the needle into the dermis of a subject. The device may further increase the speed of loading a needle into the device. By design, the device forces the acupuncture practitioner to engage the needle handle first when loading the needle into the device, thereby minimizing the likelihood that acupuncture practitioners will prick themselves at the level of the needle.

According to a part of the disclosure, there is a device comprising: (a) a housing comprising a first end comprising a first opening, and a second end that is opposite the first end, the second end comprising a second opening opposite the first opening, the first opening and the second opening in fluid communication with each other, the housing further comprising: (i) a first cavity portion adjacent to and in fluid communication with the first opening, the first cavity portion comprising a first end at the first opening and a second end opposite the first end of the first cavity portion; and (ii) a second cavity portion adjacent to and in fluid communication with the second opening, the second cavity portion comprising a first end that is at the second end of the first cavity portion, and a second end that is at the second opening of the housing, the second cavity portion in fluid communication with the first cavity portion, the second cavity portion having a smaller cross-sectional area than the first cavity portion; (b) a thrust disposed within the first cavity portion of the housing, the thrust comprising a first end, and a second end opposite the first end; (c) a coupling mechanism disposed within the first cavity portion of the housing, the coupling mechanism coupled to the second end of the thrust; and (d) a biasing mechanism disposed within the first cavity portion of the housing and between the second end of the first cavity portion and a surface of the thrust, the biasing mechanism adapted to bias the thrust towards an initial position. The housing may further comprise one or more sight slots.

The thrust may further comprise a button disposed between the first end and the second end of the thrust, and the housing may further comprise an opening through which the button at least partially extends, wherein the opening comprises a first end and a second end opposite the first end. The displacement of the button may be along a plane that is parallel to a length of the housing is limited by a distance between the first end and the second end. The biasing mechanism may bias the button towards the first end of the opening.

The second end of the thrust may be chamfered, thereby forming a first chamfered portion of the device. The second end of the first cavity portion may be chamfered, thereby forming a second chamfered portion of the device. The second chamfered portion may be adapted to receive the first chambered portion.

The thrust may further comprise a cavity at the second end of the thrust, the cavity for receiving the coupling mechanism, the coupling mechanism being in fluid communication with the first cavity portion and the second cavity portion of the housing.

According to another part of the disclosure, the device further comprises a conduit, a part of which is received within the second cavity portion. The conduit may be coupled to the housing, within the second cavity portion. The conduit may be coupled to the housing, within the second cavity portion, by frictional fit.

The conduit may be constructed of a resilient material. The resilient material may be selected from the group consisting of plastics and naturally occurring materials. The naturally occurring materials may be selected from the group consisting of materials derived from trees, sugarcane, rice, and a combination thereof.

The conduit may be an insertion tube.

According to another part of the disclosure, there is a method comprising: (a) disposing an acupuncture needle into a device for use in acupuncture, and coupling a handle of the acupuncture needle to a coupling mechanism of the device such that a shaft of the acupuncture needle extends through a second cavity portion of a housing the device; (b) positioning a tip of the acupuncture needle, the tip being on an opposite end of the handle of the acupuncture needle, proximate to an insertion location on the subject; (c) applying a force on a thrust of the device, thereby displacing the thrust within a first cavity portion of the housing in a direction towards the second cavity portion, and thereby inserting the acupuncture needle into the subject at the insertion location: and (d) releasing the force on the thrust, thereby de-coupling the coupling mechanism from the handle of the acupuncture needle.

The device disclosed herein is compatible with disposable components (such as disposable guiding tubes). The housing of the device is re-usable as it does not come into contact with tissue during insertion or dispensing of the acupuncture needle from the device. It is believed that the device further overcomes disadvantages in the prior art in that prior art devices suffer from challenges in sterilizing the lumen of the tube. As the tube of the device described herein is disposable (or replaceable after one time use), the device described herein circumvents issues related to cross-contamination at the lumen of the tube.

This summary does not necessarily describe the entire scope of all aspects of the disclosure. Other aspects, features and advantages will be apparent to those of ordinary skill in the art upon review of the following description of specific embodiments.

BRIEF DESCRIPTION OF THE DRAWINGS

In the accompanying drawings, which illustrate one or more embodiments:

FIG. 1(*b*) is a front view of the device depicted in FIG. 1(*a*).

FIG. 1(*c*) is section view of the device depicted in FIG. 1(*a*), the section view being taken along section line "AU" depicted in FIG. 1(*b*).

FIG. 1(*d*) is a front view of a device for dispensing an acupuncture needle according to another embodiment, the device comprising a thrust, a coupling component, a biasing mechanism, and a housing comprising sight holes.

FIG. 1(*e*) is a section view of the device depicted in FIG. 1(*d*), the section view being taken along section line "AY" depicted in FIG. 1(*d*).

FIG. 2(*b*) is a side view of the thrust depicted in FIG. 1(*a*) or FIG. 1(*d*).

FIG. 2(*c*) is a top section view of the thrust depicted in FIG. 1(*a*) or FIG. 1(*d*), the section view being taken along section line "AV" depicted in FIG. 2(*a*), FIG. 2(*d*) is a side section view of the thrust depicted in FIG. 1(*a*) or FIG. 1(*d*), the section view being taken along section line "AW" depicted in FIG. 2(*a*).

FIG. 2(*e*) is a bottom view of the thrust depicted in FIG. 1(*a*) or FIG. 1(*d*).

DETAILED DESCRIPTION

Figure 1A:
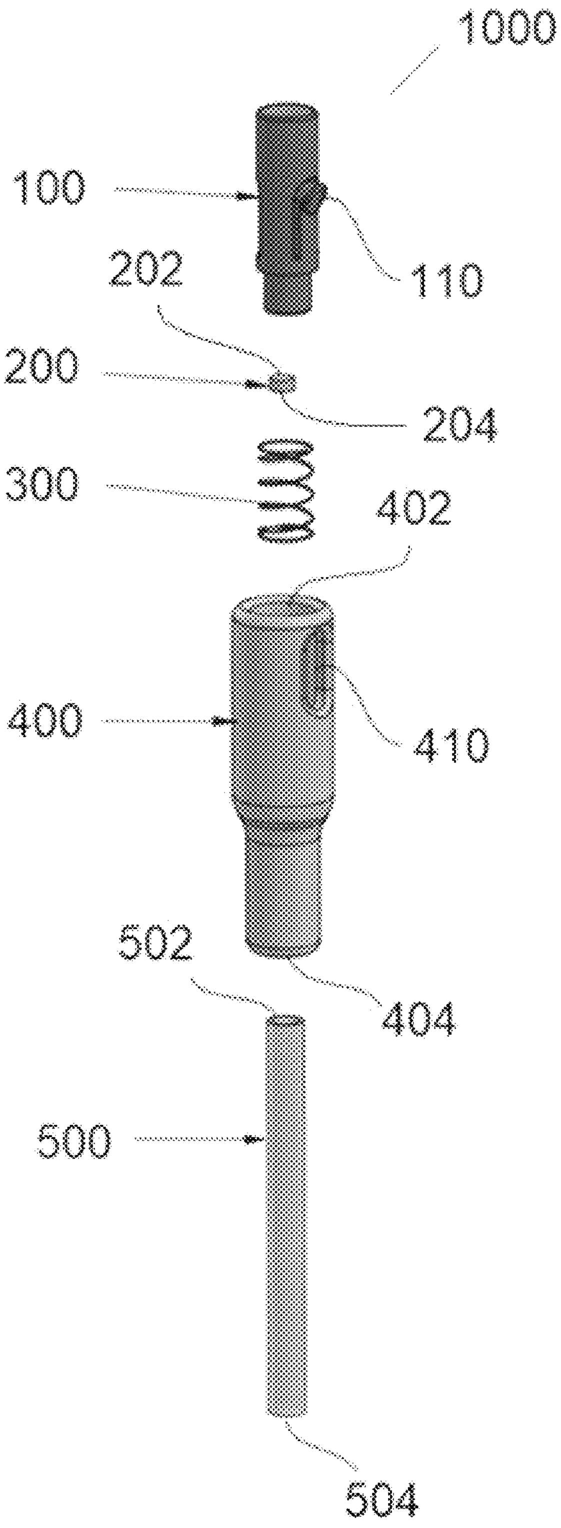
FIG. 1(*a*) is an exploded view of a device for dispensing an acupuncture needle according to an embodiment, the device comprising a thrust, a coupling component, a biasing mechanism, and a housing.

As used in this disclosure, directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment. The use of the word "a" or "an" when used herein in conjunction with the term "comprising" may mean "one," but it is also consistent with the meaning of "one or more," "at least one" and "one or more than one." Any element expressed in the singular form also encompasses its plural form. Any element expressed in the plural form also encompasses its singular form. The term "plurality" as used herein means more than one; for example, the term "plurality includes two or more, three or more, four or more, or the like.

As used in this disclosure, the terms "comprising", "having", "including", and "containing", and grammatical variations thereof, are inclusive or open-ended and do not exclude additional, un-recited elements and/or method steps. The term "consisting essentially of" when used herein in connection with a composition, use or method, denotes that additional elements, method steps or both additional elements and method steps may be present, but that these additions do not materially affect the manner in which the recited composition, method, or use functions. The term "consisting of" when used herein in connection with a composition, use, or method, excludes the presence of additional elements and/or method steps.

As used in this disclosure, the term "about", when used to describe a value, means within 5% of the stated value.

As used in this disclosure, the term "resilient", when referring to a composition, refers to an ability of that composition to substantially return back into its original form after bending, stretching, being compressed, or deformation.

As used in this disclosure, the term "substantially" is intended to contemplate any and all variations or deviations that are not of material effect.

Disclosed in the present application is a device for use in the acupuncture industry. The device provides a means by which an acupuncture practitioner can retrieve an acupuncture needle from packaging (e.g. plastic "pouch" packaging) without the acupuncture practitioner directly contacting the acupuncture needle or any part thereof. The acupuncture needle can be loaded and positioned into the device, by the acupuncture practitioner, without the acupuncture practitioner directly contacting the acupuncture needle, such as the shaft of the acupuncture needle. The device can provide a means for inserting an acupuncture needle, by an acupuncture practitioner, into the dermis of a subject without the acupuncture practitioner directly contacting the acupuncture needle. The device can provide a means for inserting an acupuncture needle, by an acupuncture practitioner, into the dermis of a subject, at a desired depth of the dermis of the subject, without the acupuncture practitioner directly contacting the acupuncture needle.

Device

Referring to the Figures, and according to embodiments of a device, there is a device 1000 for use in the acupuncture industry. The device 1000 comprises a thrust 100, a coupling mechanism 200, a biasing mechanism 300, a housing 400, and a conduit 500.

Thrust 100 comprises a first end 102, a second end 104 opposite the first end 102, a first body portion 106, and a second body portion 108. First body portion 106 is coupled to second body portion 108. First end 102 is a surface of first body portion 106. Second end 104 is a surface of second body portion 108. First body portion 106 has a larger cross-sectional area than second body portion 108. When first body portion 106 and second body portion 108 are coupled together, a surface 106*a* is formed. As contemplated in this embodiment, surface 106*a* circumscribes the perimeter of second body portion 108 where first body portion 106 and second body portion 108 are coupled together. As contemplated in this embodiment, first body portion 106 and second body portion 108 are fixedly coupled together. In other embodiments, the first body portion and the second body portion can be releasably coupled together.

Figure 2A:
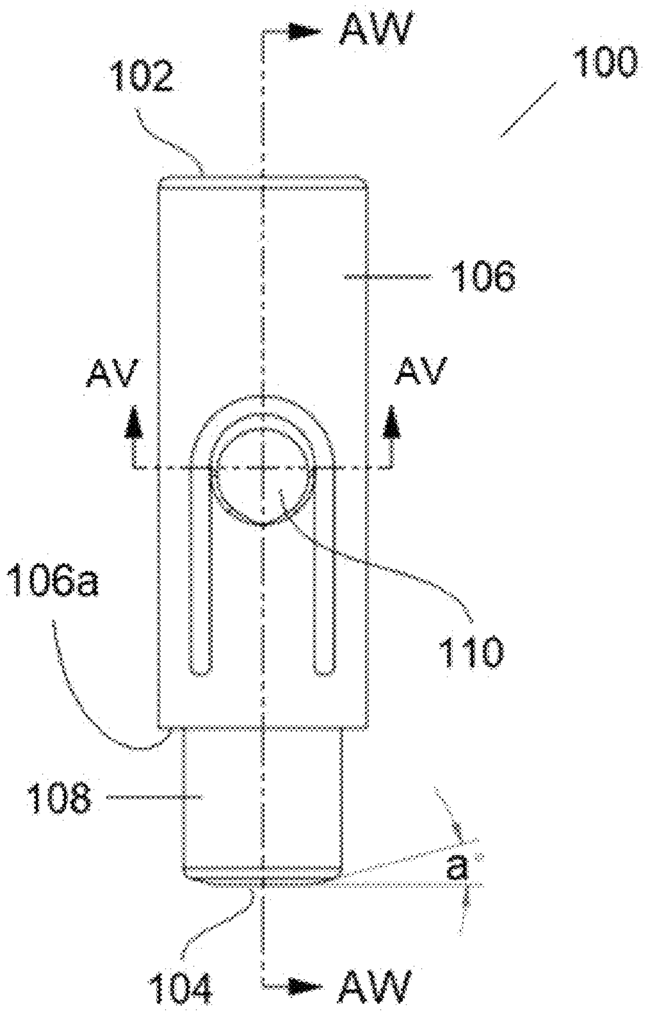
FIG. 2(*a*) is a front view of the thrust depicted in FIG. 1(*a*) or FIG. 1(*d*).
Figure 2B:
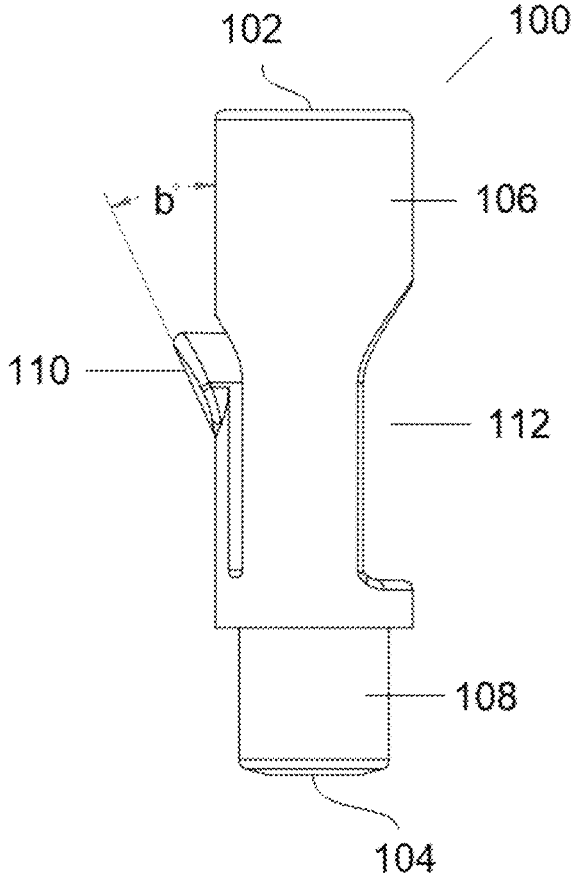
Figure 2C:
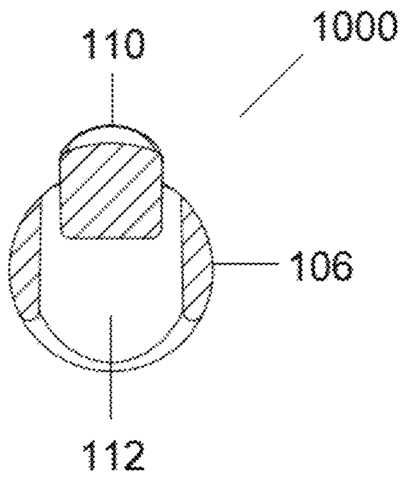
Figure 2D:
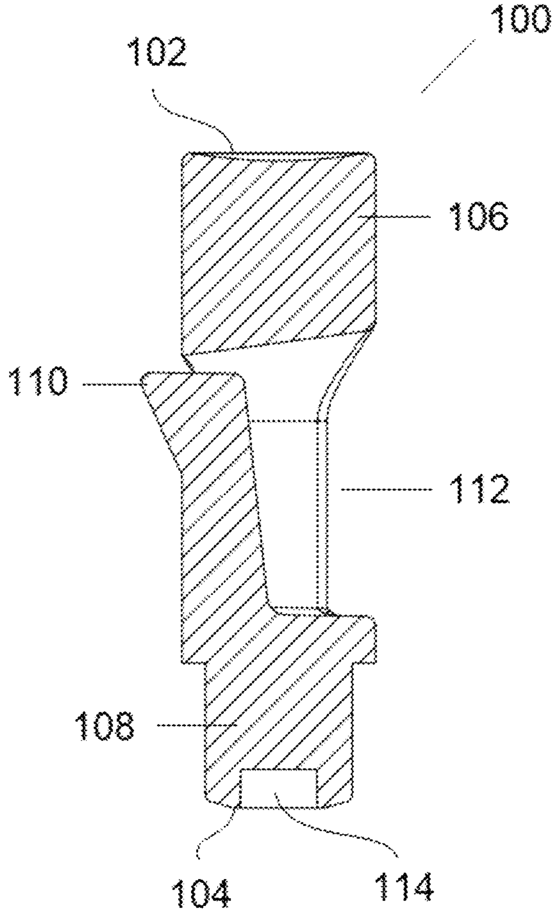
Figure 2E:
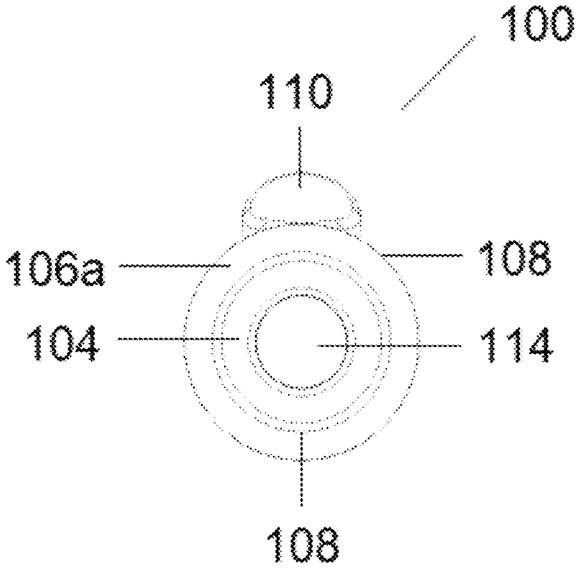

A portion of second body portion 108 is chamfered towards second end 104. The angle of chamfering is depicted in FIG. 2(*a*) as "a°". The shape of the chamfered portion of second body portion 108 can be received, in a complementary fashion, in a chamfered portion of housing 400 (described below). The chamfered portion of second body portion 108 is herein referred to as the "first chamfered portion"; the chamfered portion of housing 400 is herein referred to as the "second chamfered portion". "a°" can be any suitable angle as long as the first chamfered portion can be received, in a complementary fashion, in the second chamfered portion. As contemplated in this embodiment, "a°" is between about 10° to about 45°. As contemplated in this embodiment, the manner in which the first chamfered portion is received, in a complementary fashion, in the second chamfered portion is such that surface 204 of coupling mechanism 200 overlaps with a first end of second cavity portion 408, the first end of second cavity portion 408 being adjacent to first cavity portion 406. In other embodiments, the surface 204 does not overlap with the first end of second cavity portion 408. In other embodiments, the second body portion of the thrust does not comprise a chamfered portion or surface or a "first chamfered portion".

Thrust 100 further comprises a button 110 that can be moved, upon application of a force, from an initial position and towards and into inner cavity 112 of thrust 100. Upon release of said force, button 110 substantially returns to its initial position. Thrust 100 further comprises a cavity 114 disposed proximate to second end 104. In other embodiments, the thrust may not have a cavity.

Coupling mechanism 200 is coupled to thrust 100. As contemplated in this embodiment, coupling mechanism 200 is received into cavity 114 such that surface 202 of coupling mechanism 200 is in contact with thrust 100, while surface 204 of coupling mechanism 200 remains not in contact with thrust 100. As contemplated in this embodiment, coupling mechanism 200 is a magnetic material. The magnetic material can be any suitable magnetic material known in the art such as, but not limited to, permanent magnets, temporary magnets, ceramic magnets, ferrite magnets, and magnets comprising neodymium. As contemplated in this embodiment, coupling mechanism 200 is coupled to thrust 100 by an adhesive material. In other embodiments, the thrust and the coupling mechanism can be fixedly or reversibly coupled by other suitable means known in the art (for example, magnetic attractive force).

Biasing mechanism 300 can be any biasing mechanism known in the art. As contemplated in this embodiment, biasing mechanism is a coil spring manufactured out of a suitable material such as, but not limited, to a metal or alloy. Biasing mechanism 300 further comprises a cavity (unnumbered) adapted for receiving, or adapted to receive, second body portion 108 of thrust 100.

Housing 400 comprises a first end 402 that has an opening and a second end 404 that has an opening. Housing 400 further comprises: (i) a first cavity portion 406 defined by sidewall 406*b* surrounding first cavity portion 406; and (ii) a second cavity portion 408 defined by sidewall 408*a* surrounding second cavity portion 408. The opening at first end 402 is in fluid communication with first cavity portion 406; first cavity portion 406 is in fluid communication with second cavity portion 408; second cavity portion 408 is in fluid communication with the opening at second end 404.

A surface 406*a* is formed where first cavity portion 406 and second cavity portion 408 meet each other. Surface 406*a* circumscribes the perimeter of the opening of second cavity portion 408, said opening being proximate and in fluid communication with first cavity portion 406. At least a portion of surface 406*a* is formed by chamfering. The chamfered portion of surface 406*a* (that is, the "second chamfered portion") is adapted to receive, in a complementary fashion, the first chamfered portion. In other embodiments, surface 406*a* is not chamfered.

First cavity portion 406 is adapted for receiving, or adapted to receive, thrust 100, coupling mechanism 200, and biasing mechanism 300. Second cavity portion 408 is adapted for receiving, or adapted to receive, conduit 500. Housing 400 further comprises an opening 410 adapted for receiving, or adapted to receive, button 110 of thrust 100.

Figure 1B:
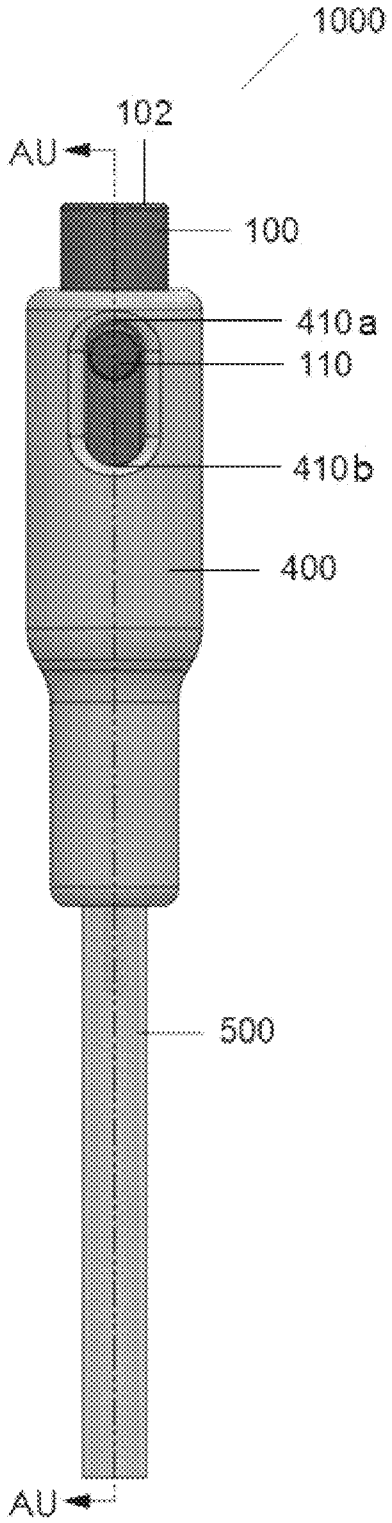
Figure 1C:
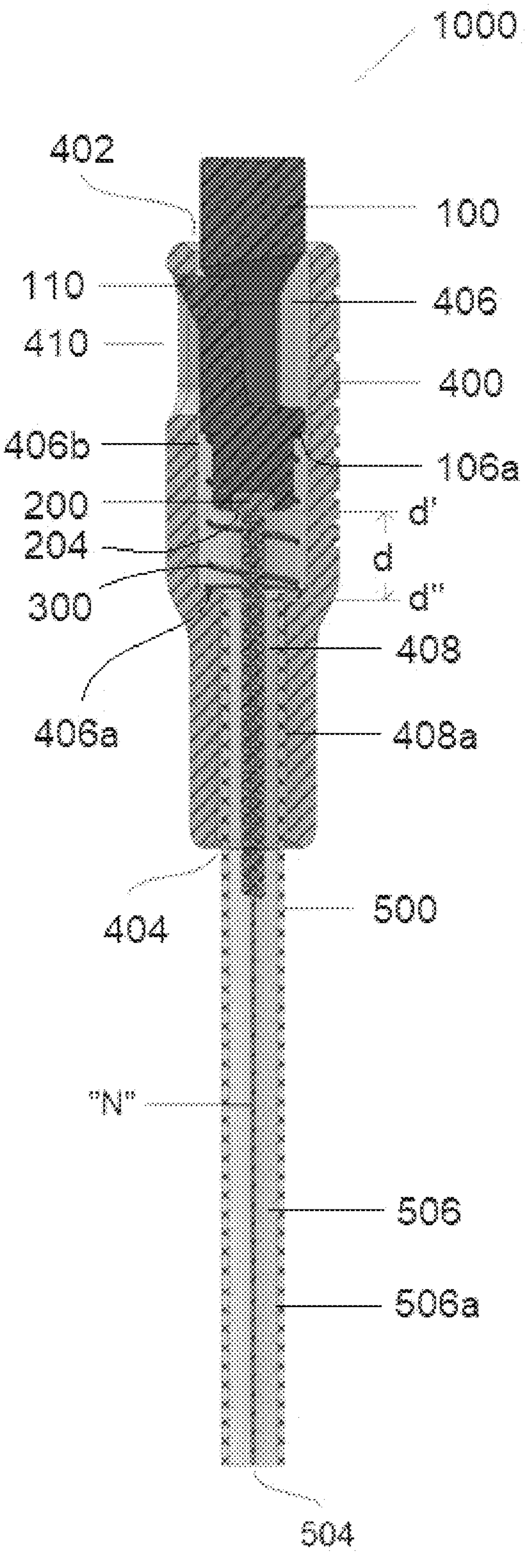
Figure 1D:
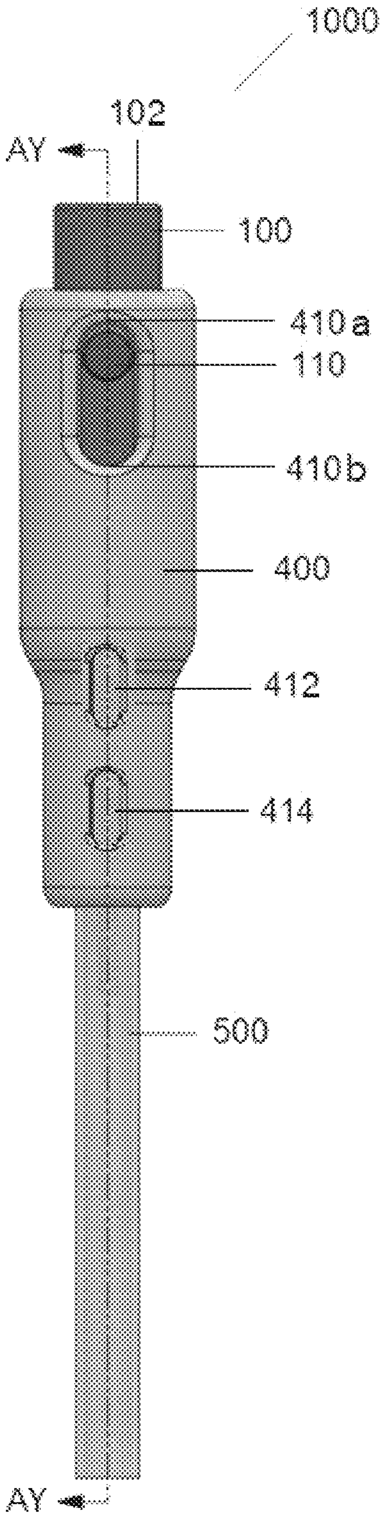
Figure 1E:
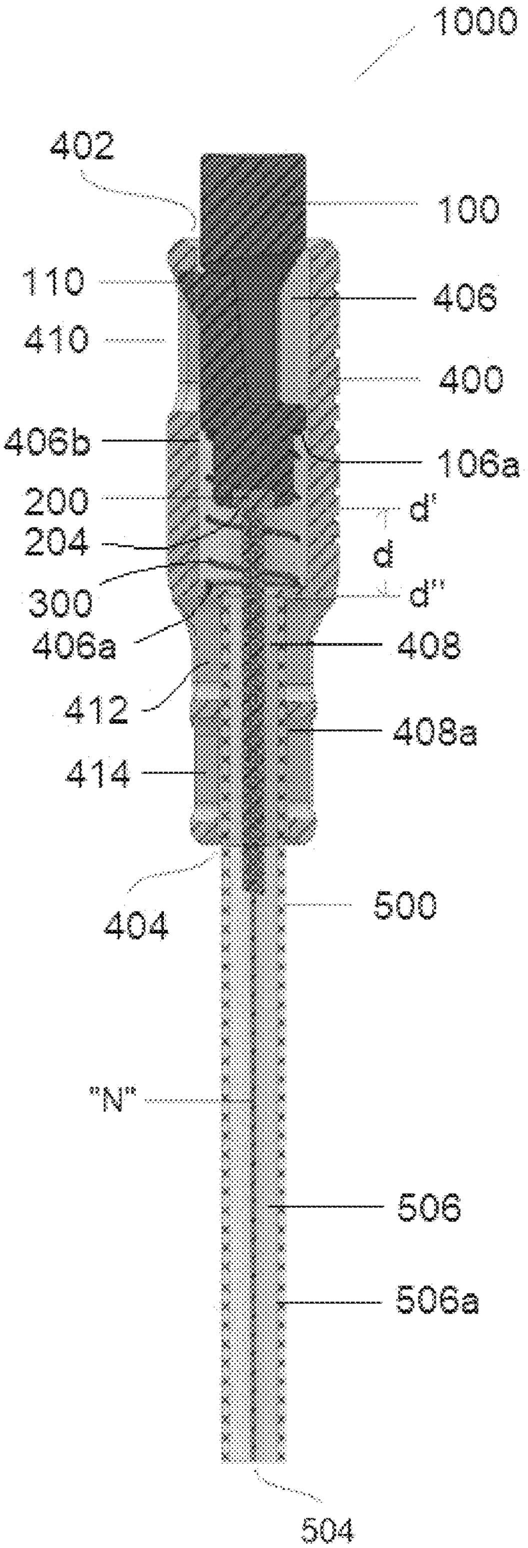

In some embodiments, the housing further comprises one or more sight slots. As depicted in an embodiment shown in FIGS. 1(*d*) and 1(*e*), housing 400 can comprise two sight slots 412 and 414. Advantageously, the sight slots permit an operator of device 1000 to determine the depth to which conduit 500 (described below) is received into second cavity portion 408. In some embodiments, the housing does not comprise any sight slots.

Conduit 500 provides a means for assisting with the guidance of an acupuncture needle "N" into the dermis of a subject. Conduit 500 provides a means for assisting with the maintenance of a spatial orientation (e.g. directional orientation) of an acupuncture needle "N", particularly during an insertion of said acupuncture needle "N" into the dermis of a subject. Conduit 500 also provides a means for retrieving an acupuncture needle "N" from bulk packaging and for guiding the head of said needle toward coupling mechanism 200, Conduit 500 comprises a first end 502, a second end 504, and a channel 506 that is enclosed by a circumscribing sidewall 506*a*. First end 502 and second end 504 are in fluid communication with each other through channel 506.

As contemplated in this embodiment, conduit 500 is manufactured of a resilient material that can deform from an initial shape upon application of a force and that can substantially return to its initial shape upon cessation of application of said force. The resilient nature of the material of conduit 500 allows an acupuncture practitioner to retrieve an acupuncture needle without the acupuncture practitioner being in direct contact with the acupuncture needle. For example, an acupuncture practitioner can position conduit 500 relative to acupuncture needle "N" such that acupuncture needle "N" is received through second end 504 of conduit 500 and into channel 506. From there, the acupuncture practitioner can "pick up" acupuncture needle "N" (without the acupuncture practitioner actually directly touching or contacting acupuncture needle "N") by applying a force to conduit 500 such that sidewall 506*a* is pressed against acupuncture needle "N" handle. In doing so, acupuncture needle "N" is prevented from exiting channel 506*a* owing at least to the frictional force that is formed between acupuncture needle "N" and sidewall 506*a*. Acupuncture needle "N" may be released from conduit 500 by releasing the force applied to conduit 500, thereby at least removing the frictional force between acupuncture needle "N" and sidewall 506*a*. The resilient material can be any suitable material known in the art. Non-limiting examples of resilient materials suitable for manufacturing conduit 500 include those derived from plastics and naturally occurring materials such as cellulose from trees, sugarcane, or rice. As contemplated in this embodiment, conduit 500 is made of polypropylene. In other embodiments, the conduit may not be made from a resilient material but instead can be a non-resilient conduit (e.g. a steel conduit).

A non-limiting example of conduit 500 is an "insertion tube", as such term is understood in the acupuncture industry.

Referring to FIGS. 1(*b*), 1(*c*), 1(*d*) and 1(*e*), thrust 100, coupling mechanism 200, and biasing mechanism 300 are received into first cavity portion 406 of housing 400. Coupling mechanism 200 is received into cavity 114 and coupled to thrust 100. Surface 204 of coupling mechanism 200 remains exposed. Second body portion 108 is received into a cavity (not numbered) of biasing mechanism 300. A first end of biasing mechanism 300 in positioned in contact against surface 106*a*. A second end of biasing mechanism 300, the second end being opposite the first end of biasing mechanism 300, is positioned in contact against surface 406*a*.

Referring to FIGS. 1(*b*), 1(*c*), 1(*d*) and 1(*e*), thrust 100 is received into first cavity portion 406 at a depth permitting button 110 to extend into opening 410. Owing to the contact of the first end of biasing mechanism 300 against surface 106*a*, button 110 of thrust 100 is biased towards first end 410*a* of opening 410. Upon an application of force onto first end 102 of thrust 100, the first end of biasing mechanism 300 moves towards surface 406*a* and button 110 moves in a direction towards second end 410*b* of opening 410. Depending on the amount of force applied onto first end 102, button 110 can be compelled to move up to a distance of "d", which is commensurate with the distance that an acupuncture needle ultimately is inserted into the dermis of a subject. Upon release of the force applied onto first end 102, button 110 moves towards first end 410*a* and can be pressed against first end 410*a* owing to the force applied against surface 106*a* by biasing mechanism 300.

Referring to FIGS. 1(*c*) and 1(*e*), distance d can be adjusted according to the desired maximum distance that thrust 100 moves relative to housing 400. As depicted in FIGS. 1(*b*) and 1(*c*), biasing mechanism 300 biases thrust 100 in the direction of opening 402, and biases button 110 towards and against first end 410*a* of opening 410. This first position of thrust 100 relative to housing 400 is identified as d' in FIG. 1(*c*). Upon application of suitable pressure on first end 102, thrust 100 can be displaced in a direction toward second cavity portion 408. Upon application of a suitable amount of pressure on first end 102, thrust 100 can be displaced in a direction toward second cavity portion 408 until the first chamfered portion is received in the second chamfered portion and the surfaces of the respective chamfered portions are in contact with each other. This second position of thrust 100 relative to housing 400 is identified as d" in FIG. 1(*c*). The distance between d' and d" (that is, the maximum displacement of thrust 100 relative to housing 400) is indicated as distance d in FIG. 1(*c*). The distance d can be determined or modified by the geometry of the housing. For example, the configuration of the thrust relative to the housing can be modified such that the distance d can be about 1 mm, about 2 mm, about 3 mm, about 4 mm, about 5 mm.

In other embodiments, the distance that the thrust can travel relative to the housing can be adjusted according to the desired maximum distance that button 110 can travel within opening 410, which in turn reflects the depth to which acupuncture needle "N" can be inserted into a subject (as described below). For example, the desired depth to which acupuncture needle "N" is to be inserted into a subject may vary depending on the assessment of the acupuncture practitioner, with desired depths including but not limited to about 1 mm, about 2 mm, about 3 mm, about 4 mm, about 5 mm. The distance that the thrust can travel relative to the housing can either be related to the distance between the first end of opening 410 and the second end of opening 410, or be determined by a distance adjuster with which opening 410 is equipped, said distance adjuster for modifying the distance that the thrust can travel relative to the housing as appropriate for the particular acupuncture application.

In other embodiments, the distance that the thrust can travel relative to the housing is pre-set according to the size of opening 410 and the size of button 110 relative to opening 410, such that a maximum distance of motion of button 110 from a first end of opening 410 to a second end of opening 410 is pre-determined. For example, the distance that the thrust can travel relative to the housing can be pre-set such that button 110 has a maximum displacement of about 3 mm within opening 410, which translates to a maximum displacement of thrust 100 within first cavity portion 406 of about 3 mm. For example, the distance that the thrust can travel relative to the housing can be pre-set such that button 110 has a maximum displacement of about 4 mm within opening 410, which translates to a maximum displacement of thrust 100 within first cavity portion 406 of about 4 mm. A 3 mm or 4 mm displacement is desirable in an application related to inserting an acupuncture needle into the dermis of a subject.

Referring to FIGS. 1(*b*) and 1(*c*), conduit 500 is releasably coupled to housing 400. As contemplated in this embodiment, first end 502 is inserted into second cavity portion 408 and a portion of conduit 500 extends into second cavity portion 408. As contemplated in this embodiment, conduit 500 is coupled to sidewall 408*a* by friction fit. In other embodiments, the conduit can be coupled to housing by other suitable methods known in the art.

Method of Using Device 1000

In practice, the various components of device 1000 can be coupled together. An acupuncture practitioner retrieves an acupuncture needle "N" by introducing the handle of the needle "N" through second end 504 of conduit 500 and into channel 506. Second end 504 is then oriented upward and in a manner such that the pull of gravity directs the handle of acupuncture needle "N" through channel 506, through second cavity portion 408 of housing 400, through first end 502 of conduit 500, into first cavity portion 406 of housing 400, through the cavity (un-numbered) extending through biasing mechanism 300, and towards surface 204 of coupling mechanism 200.

The handle of acupuncture needle "N" is coupled to surface 204 of coupling mechanism 200 by an attractive magnetic force. Second end 504 of conduit 500 is then oriented downward and in a direction of a subject for receiving one or more acupuncture needles. Because of the attractive magnetic force between coupling mechanism 200 and the head of acupuncture needle "N", acupuncture needle "N" does not "fall" out of (or decouple from) device 1000 when the head of acupuncture needle "N" is coupled to surface 204 of coupling mechanism 200. Preferably, the needle tip of acupuncture needle "N" is located on the same spatial plane, or substantially the same spatial plane, as second end 504 of conduit 500 (as shown by way of example in FIGS. 1(*c*) and 1(*e*)).

A location to insert acupuncture needle "N" into the subject is determined by the acupuncture practitioner. Second end 504 is placed in contact with the epidermis of the subject. The acupuncture practitioner applies a force on first end 102 of thrust 100 of device 1000, thereby inserting the needle tip of acupuncture needle "N" into the subject to a desired depth, the desired depth being commensurate with the distance that thrust 100 travels relative to housing 400.

Upon insertion of acupuncture needle "N" into the dermis of the subject, device 1000 is removed, and acupuncture needle "N" remains in the dermis of the subject. The frictional force between the dermis of the subject and acupuncture needle "N" is sufficient to overcome the attractive magnetic force between coupling mechanism 200 and the handle of acupuncture needle "N".

General

It is contemplated that any part of any aspect or embodiment discussed in this specification may be implemented or combined with any part of any other aspect or embodiment discussed in this specification. While particular embodiments have been described in the foregoing, it is to be understood that other embodiments are possible and are intended to be included herein. It will be clear to any person skilled in the art that modification of and adjustment to the foregoing embodiments, not shown, is possible.

Unless defined otherwise, all technical and scientific terms used herein have the same meaning as is commonly understood by one of ordinary skill in the art to which this invention belongs. In addition, any citation of references herein is not to be construed nor considered as an admission that such references are prior art to the present invention.

The scope of the claims should not be limited by the example embodiments set forth herein, but should be given the broadest interpretation consistent with the description as a whole.

What is claimed is:

1. A device for use in acupuncture, the device comprising:

(a) a housing comprising a first end and a second end that is opposite the first end, the first end comprising a first opening, the second end comprising a second opening opposite the first opening, the housing further comprising:
  (i) a first cavity portion adjacent to and in fluid communication with the first opening, the first cavity portion comprising a first end at the first opening and a second end opposite the first end of the first cavity portion; and
  (ii) a second cavity portion adjacent to and in fluid communication with the second opening, the second cavity portion comprising a first end that is at the second end of the first cavity portion, and a second end that is at the second opening of the housing, the second cavity portion in fluid communication with the first cavity portion, the second cavity portion having a smaller cross-sectional area than the first cavity portion;
(b) a thrust disposed within the first cavity portion of the housing, the thrust comprising a first end, and a second end opposite the first end;
(c) a coupling mechanism disposed within the first cavity portion of the housing, the coupling mechanism coupled to the second end of the thrust; and
(d) a biasing mechanism disposed within the first cavity portion of the housing and between the second end of the first cavity portion and a surface of the thrust, the biasing mechanism adapted to bias the thrust towards an initial position;

wherein the coupling mechanism comprises a magnetic material, and the magnetic material exerts a force on an acupuncture needle less than the frictional force between a dermis and the acupuncture needle when the acupuncture needle is inserted in the dermis.

2. The device as claimed in claim 1, the housing further comprising one or more sight slots.

3. The device as claimed in claim 2 further comprising a button, wherein displacement of the button along a plane that is parallel to a length of the housing is limited by a distance between the first end of the first cavity portion and the second end of the first cavity portion.

4. The device as claimed in claim 3, wherein the biasing mechanism biases the button towards the first end of the first opening.

5. The device as claimed in claim 1, wherein:

(a) the thrust further comprises a button disposed between the first end and the second end of the thrust; and
(b) the housing further comprises an opening through which the button at least partially extends, the opening comprising a first end and a second end opposite the first end.

6. The device as claimed in claim 1, wherein the second end of the thrust is chamfered, thereby forming a first chamfered portion of the device.

7. The device as claimed in claim 6, wherein the second end of the first cavity portion is chamfered, thereby forming a second chamfered portion of the device, and wherein the second chamfered portion is adapted to receive the first chambered portion.

8. The device as claimed in claim 1, the thrust further comprising a cavity at the second end of the thrust, the cavity for receiving the coupling mechanism, the coupling mechanism being in fluid communication with the first cavity portion and the second cavity portion of the housing.

9. The device as claimed in claim 1, the device further comprising a conduit, a part of which is received within the second cavity portion.

10. The device as claimed in claim 9, wherein the conduit is coupled to the housing, within the second cavity portion.

11. The device as claimed in claim 10, wherein the conduit is coupled to the housing, within the second cavity portion, by frictional fit.

12. The device as claimed in claim 9, wherein the conduit is constructed of a resilient material.

13. The device as claimed in claim 12, wherein the resilient material is selected from the group consisting of plastics and naturally occurring materials.

14. The device as claimed in claim 13, wherein the naturally occurring materials are selected from the group consisting of materials derived from trees, sugarcane, rice, and a combination thereof.

15. The device as claimed in claim 9, wherein the conduit is an insertion tube.

16. A method comprising:

(a) disposing an acupuncture needle into the device as claimed in claim 1, and coupling a handle of the acupuncture needle to the coupling mechanism such that a shaft of the acupuncture needle extends through the second cavity portion of the housing;

(b) positioning a tip of the acupuncture needle, the tip being on an opposite end of the handle of the acupuncture needle, proximate to an insertion location on the subject;

(c) applying a force on the thrust of the device, thereby displacing the thrust within the first cavity portion of the housing in a direction towards the second cavity portion, and thereby inserting the acupuncture needle into the subject at the insertion location; and (d) releasing the force on the thrust, thereby de-coupling the coupling mechanism from the handle of the acupuncture needle.

17. The device as claimed in claim 1, wherein the coupling mechanism is configured to exert the force on the acupuncture needle less than the frictional force between the dermis and the acupuncture needle when the acupuncture needle is inserted in the dermis.

* * * * *